(12) United States Patent
Krämer et al.

(10) Patent No.: US 12,313,437 B2
(45) Date of Patent: May 27, 2025

(54) FASTENING DEVICE FOR A FIELD DEVICE

(71) Applicant: VEGA GRIESHABER KG, Wolfach (DE)

(72) Inventors: Florian Krämer, Mühlenbach (DE); Patrick Heizmann, Oberwolfach (DE); Stefan Allgaier, Oberwolfach (DE)

(73) Assignee: VEGA Grieshaber KG, Wolfach (DE)

( * ) Notice: Subject to any disclaimer, the term of this patent is extended or adjusted under 35 U.S.C. 154(b) by 915 days.

(21) Appl. No.: 17/160,627

(22) Filed: Jan. 28, 2021

(65) Prior Publication Data

US 2021/0247224 A1    Aug. 12, 2021

(51) Int. Cl.
*G01F 23/22* (2006.01)
*H01Q 1/12* (2006.01)
*H01Q 1/22* (2006.01)
*H04W 4/38* (2018.01)

(52) U.S. Cl.
CPC ........... *G01F 23/22* (2013.01); *H01Q 1/1214* (2013.01); *H01Q 1/2291* (2013.01); *H04W 4/38* (2018.02)

(58) Field of Classification Search
CPC ....... G01F 23/22; H04W 4/38; H01Q 1/1214; H01Q 1/2291; H01Q 1/225
See application file for complete search history.

(56) References Cited

U.S. PATENT DOCUMENTS

| | | | | |
|---|---|---|---|---|
| 6,062,095 A | * | 5/2000 | Mulrooney | G01D 11/24 73/204.22 |
| 10,224,623 B1 | * | 3/2019 | Spears | H04R 1/02 |
| 2006/0130885 A1 | * | 6/2006 | Garcia | B08B 3/006 134/169 C |
| 2007/0245824 A1 | * | 10/2007 | Blokhuis | G01F 25/22 73/313 |
| 2013/0181829 A1 | * | 7/2013 | Schnitz | G01F 23/80 340/539.1 |

FOREIGN PATENT DOCUMENTS

| | | |
|---|---|---|
| DE | 102004041857 A1 | 3/2006 |
| DE | 102014116674 A1 | 5/2016 |
| DE | 102016124981 A1 | 6/2018 |
| WO | WO 2012104713 A1 | 8/2012 |

OTHER PUBLICATIONS

EPO search report for related European application 20163057 issued on Sep. 23, 2020.

* cited by examiner

*Primary Examiner* — Jennifer Bahls
*Assistant Examiner* — Quang X Nguyen
(74) *Attorney, Agent, or Firm* — William Gray Mitchell

(57) ABSTRACT

An autonomous field device for process automation, having a sensor, a wireless module, and a fastening device to fasten the field device on a wall, wherein the fastening device has at least a two-part design and is formed such that a first, sensor-side part of the fastening device can be installed from a first side of the wall and a second part of the fastening device can be installed from a second side of the wall, wherein the parts of the fastening device form a mechanical first interface penetrating the wall in order to fasten the field device on the wall.

12 Claims, 2 Drawing Sheets

FASTENING DEVICE FOR A FIELD DEVICE

CROSS REFERENCE TO RELATED APPLICATIONS

This patent application claims priority to European Patent Application 20163057.1, filed on Mar. 13, 2020.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a fastening device for a field device for process automation.

Background of the Invention

Various fastening devices for field devices are known from the prior art. In many cases, a field device is fastened in a metrology environment using a standardized process connection.

A process connection is defined as the mechanical interface to arrange a field device or a sensor in a process environment. Known process connections comprise various threaded connections and flanges by means of which the field device can be arranged in the process environment. The field device is for this purpose for example threaded into a wall of a container, such as a tank, silo, or a pipe assembly, or joined to a flange connected thereto.

The term 'field device' in this case subsumes various technical devices that are directly related to a production process "Field" in this case refers to the area outside of control centers. Field devices can then in particular be actuators, sensors, and transducers.

In technical process automation, field devices are frequently used, which serve to detect and/or influence process variables. Examples for such field devices are fill level gauges, limit gauges, and pressure measuring devices with sensors, which detect the respective process variables fill level, limit, or pressure.

Autonomous field devices are characterized by particularly straightforward assembly without attaching a communications or supply line, and therefore provide particularly flexible options for their arrangement, e.g. in particular for their arrangement in the process environment. An autonomous field device according to the present application features at least one sensor for recording a process variable, sensor electronics, a wireless module, and a power supply.

The metrology readings recorded by these field devices are typically transmitted to a cloud, e.g. to a server in the world wide web using narrowband wireless technology (LoRa, Sigfox, NB-IoT). Typical application scenarios for such field devices comprise areas such as high water forecasting, inventory management, but also other decentralized, distributed metrology tasks.

Field devices for process automation having a metal housing and a wireless module with an antenna are also known from the prior art.

Frequently, such field devices are connected to superordinate units, for example guidance systems or control units. These superordinate units serve for process control, process visualization, and/or process monitoring.

Field devices are frequently used with metal housings due to their mechanical strength and resistance to environmental influences. When field devices are used in explosive environments, such field devices must fulfill special requirements that also call for the use of metal housings. For example, for the explosion protection type 'flameproof encapsulation' (Ex d), the housing of a field device is not permitted to burst as a result of explosive pressure within the housing, which is typically achieved by housings having a metal design. For the explosion protection type 'flameproof encapsulation,' the components that can trigger an ignition of a for example flammable gas are installed into a housing that withstands the explosive pressure. The openings of the housing are designed to prevent the transfer of the explosion to the exterior. All closures and feed-through openings of the housing must be designed according to this explosion protection type and therefore partially require elaborate designs.

It is known from the prior art, for example, to use wireless modules for easier operation and parameter programming of field devices. Operation and parameter programming using wireless modules simplifies the field work for operators, because the field device does not need to be opened, for example for parameter programming, and may for this purpose not need to be taken completely out of service in explosive environments.

But the use of wireless modules is inconsistent with housings made of metal. If a wireless transmitter/receiver is located within the sensor housing together with the remaining sensor electronics of a field device, for example a fill level sensor, metal housing walls prevent the propagation of electromagnetic waves and therefore the desired wireless connection.

It is therefore known from the prior art to equip metal housings with a glass window that is used for readability of an installed display, and at the same time also permits a wireless connection through the glass window. However, it is regarded as disadvantageous that such a wireless connection is subject to a strong directional effect and can therefore only be used with restrictions.

It is further known to guide a communication signal through the housing using a coaxial cable guided through a cable gland and to feed an exterior antenna attached there with this signal. This is regarded to have the disadvantage that the field device housing requires an additional cable gland and must be given an appropriately explosion-proof design.

There are an increasing number of metrology tasks for which it is desired that an autonomous field device is arranged in the immediate process environment without an elaborate process connection. In particular for process vessels made of metal, this results in problems for wireless communication because the metal of the process vessel prevents the propagation of the electromagnetic waves for the wireless connection. Currently, when a field device with a wireless module, in particular a sensor, is installed in the interior of a metal tank, a feed-through to the external antenna must be installed to transmit the sensor data. Either the use of autonomous field devices is then not possible in such situations, or it is necessary to feed an antenna cable through a cable gland from the interior of the process vessel. This calls for retainers for the sensor, the one cable gland, and the antenna itself. Moreover, the antenna must be connected to the sensor using a cable. But corresponding antenna connections are frequently not specified on autonomous field devices.

The objective of the present invention is to enhance a fastening arrangement for an autonomous field device such that a flexible arrangement of the field device continues to be possible. This objective is attained in a field device showing the features as described herein.

BRIEF SUMMARY OF THE INVENTION

In a preferred embodiment, an autonomous field device (3) for process automation, having a sensor, a wireless module (4), and a fastening device (5) to fasten the field device on a wall (21), characterized in that the fastening device (5) has at least a two-part design and is formed such that a first, sensor-side part (51) of the fastening device (5) can be installed from a first side of the wall (21) and a second part (52) of the fastening device (5) can be installed from a second side of the wall (21), wherein the parts (51, 52) of the fastening device (5) form a mechanical first interface penetrating the wall (21) in order to fasten the field device (3) on the wall (21) in this manner.

In another preferred embodiment, an autonomous field device (3) as described herein, characterized in that at least one part of the fastening device (5) is formed to penetrate the wall (21).

In another preferred embodiment, an autonomous field device (3) as described herein, characterized in that a part of the first part (51) of the fastening device (5) is at least sectionally formed as a housing of the field device (3).

In another preferred embodiment, an autonomous field device (3) as described herein, characterized in that the parts (51, 52) of the fastening device (5) form a second interface for signal and/or power transmission.

In another preferred embodiment, an autonomous field device (3) as described herein, characterized in that the second part (52) of the fastening device (5) has an antenna (9).

In another preferred embodiment, an autonomous field device (3) as described herein, characterized in that the second part (52) of the fastening device (5) has a display and/or operator unit.

In another preferred embodiment, an autonomous field device (3) as described herein, characterized in that the part of the fastening device (5) that penetrates the wall (21) has a circular-cylindrical design.

In another preferred embodiment, an autonomous field device (3) as described herein, characterized in that the first interface (51) Is formed as a threaded, snap, bayonet, or socket connection.

In another preferred embodiment, an autonomous field device (3) as described herein, characterized in that the first interface (51) can be operated without tools.

In another preferred embodiment, an autonomous field device (3) as described herein, characterized in that the first interface (51) can be exclusively operated with special-purpose tools.

In another preferred embodiment, an autonomous field device (3) as described herein, characterized in that the first part (51) of the fastening device (5) comprises a gasket that is compressed against the wall (21) by fastening the field device (3) such that said gasket is brought into contact with the wall (21) to form a seal.

In another preferred embodiment, an autonomous field device (3) as described herein, characterized in that the second part (52) of the fastening device (5) is formed to be driven over.

Autonomous field device (3) according to any of the above claims, characterized in that an activation device is designed such that the field device (3) can only be activated in a state installed on a wall (21).

In another preferred embodiment, an autonomous field device (3) as described herein, characterized in that the activation device is designed such that the field device (3) is automatically activated in the installed state.

In another preferred embodiment, a modular set consisting of a first part (51) and several second parts (52) having respectively different wireless modules (4) for implementing different wireless standards.

DETAILED DESCRIPTION OF THE INVENTION

Figure 1:
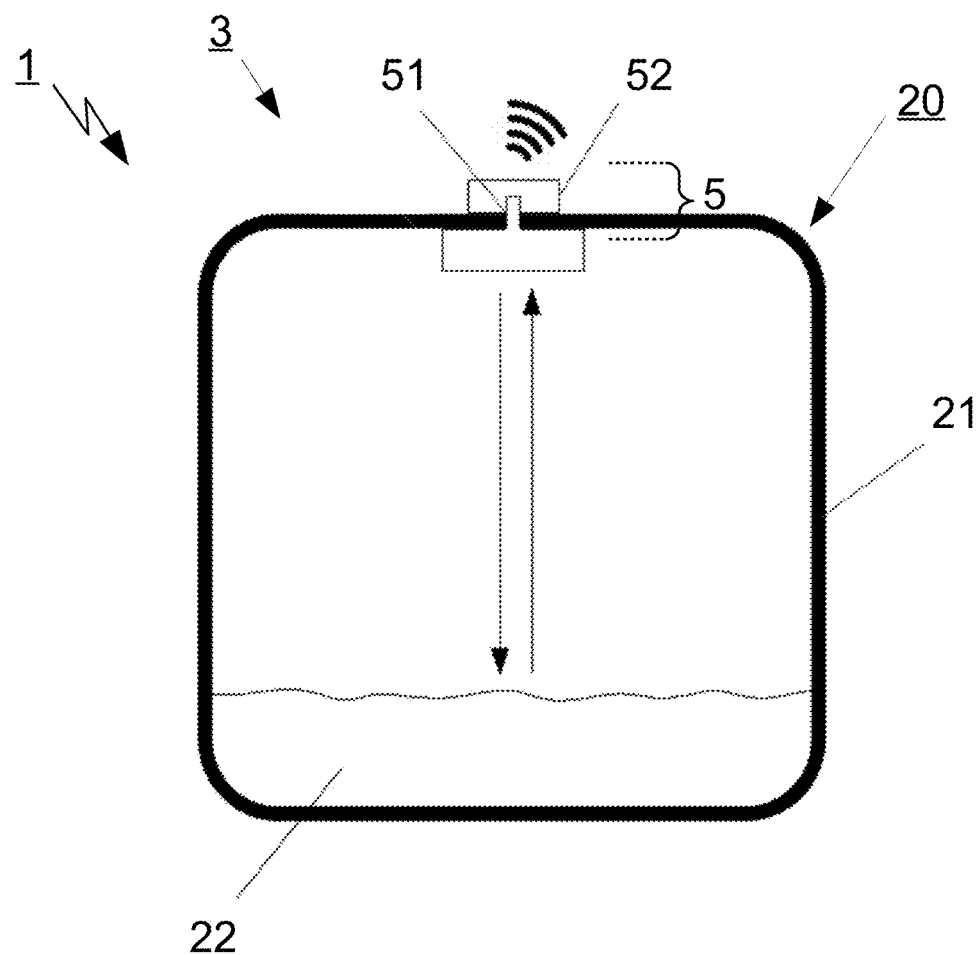
FIG. 1 is a line drawing evidencing a metrology arrangement for fill level measurement in a metal tank.

An autonomous process automation field device according to the invention, having a sensor, a wireless module, and a fastening device to fasten the field device on a wall is characterized in that the fastening device has at least a two-part design and is formed such that a first, sensor-side part of the fastening device can be arranged from a first side of the wall and a second part of the fastening device can be arranged from a second side of the wall, wherein the parts of the fastening device form a mechanical first interface penetrating the wall in order to fasten the field device on the wall in this manner.

The autonomous field device according to the invention can then by means of its fastening device be fastened through an opening in a wall, e.g. of a container, on which the field device is to be arranged. For fastening, the first part of the fastening arrangement is arranged on one side of the wall, e.g. a container interior, and the second part of the fastening arrangement is arranged on an opposing side of the wall, e.g. on the exterior of the container. Using the mechanical interface formed by the parts of the fastening device, the two parts of the fastening device are joined to each other such that the field device is fastened on the wall.

Wireless signals can travel from one side of the wall to the other side of the wall through the opening, thus enabling wireless communication of the field device In an embodiment of the field device, at least one part of the fastening device is designed to at least partially penetrate the wall. This means that this part of the fastening device in the installed state of the field device in a cross-sectional rendering is at least sectionally formed overlapping with the wall. Preferably, the part penetrating the wall reaches all the way to the opposing side of the wall, that is to say the first part of the fastening device that is arranged on the sensor side reaches to the side of the wall on which the second part of the fastening device is arranged.

When for example the sensor of the field device is arranged in the interior of a metal container, e.g. a metal tank, the present embodiment provides the option for arranging an antenna of the wireless module of the field device in the part of the fastening device penetrating the wall. In this manner, the antenna for wireless communication of the field device is located outside of the metal container, thus enabling wireless communication A particularly skillful design can be achieved when a part of the sensor side part of the fastening device is at least sectionally formed as a housing of the field device. In this manner, the fastening device can be formed to be integrated with the housing, preferably formed as a single part.

In this manner, straightforward manufacturing can be achieved in addition to the fact that no additional seals are needed to ensure tightness of the field device.

The parts of the fastening device can furthermore form a second interface for signal and/or power transmission. In this manner, a mechanical connection of the two parts of the fastening device is possible, in addition to a signal and/or power transmission.

In this manner, for example a display and/or operator module of the field device can be arranged on the side of the wall facing away from the sensor, that is to say in particular outside of a container. In the same manner, it is possible to arrange a power supply in the form of a battery or storage battery, an energy harvesting module, or another suitable means for supplying power to the field device outside of the container.

An interface for signal transmission further enables arranging the antenna or the antenna and the wireless module of the field device on the side of the wall facing away from the sensor, that is to say in particular outside of the container. This also allows the second part of the fastening device to have an interchangeable design, thus making various wireless modules and corresponding antennas available for interchange.

For this purpose, the second part of the fastening device can preferably have one or several antennas. Using one or the several antennas, the prerequisites for wireless communication according to one or several wireless standards can be made available.

Additionally or alternatively, the second part of the fastening device can have a display and/or operator unit.

The part of the fastening device that penetrates the wall preferably has a circular-cylindrical design. A circular-cylindrical design of this part simplifies creating and also sealing the opening. The opening can for example be easily implemented as a bore. A circular-cylindrical opening can be sealed particularly easily with commercially available gaskets or O-rings.

In order to enable simple installation and dismantling of the field device, the mechanical first interface can be formed as a threaded, snap, bayonet, or socket connection. The mechanical interface can preferably be operated without tools, which can be achieved particularly easily with the aforementioned connection types.

If elevated safety against unauthorized interventions is desired, the mechanical first interface can alternatively be designed to be exclusively operated with special-purpose tools. This can be achieved with special threaded fasteners with proprietary tool interfaces or by securing the aforementioned connection types with a security measure that can only be actuated with a special-purpose tool.

Preferably, the sensor side first part of the fastening device has a gasket that is compressed against the wall by fastening the field device such that the gasket forms a seal against the wall.

In this manner, it can be achieved that the opening needed for installing the present field device is sealed when the field device is installed.

In various applications, it can make sense when the second part of the fastening device can be driven over.

A design of the second part of the fastening device that can be driven over allows the field device to be used for example in floor tanks, wherein the second part of the fastening device can be arranged outside of the floor tank. A design that can be driven over allows the second part of the fastening device to also be arranged for example on shaft covers or manhole covers located in the travel path of vehicles.

The field device can have an activation device designed such that the field device can only be activated when in a state installed on a wall. The activation device is preferably designed such that the field device is automatically activated in the installed state.

In this manner, it can be prevented that the field device is activated and consumes power in the uninstalled state. In this manner, power consumption can be reduced and it can be prevented that the field device—because it is not installed correctly—transmits invalid metrology readings.

Due to the present invention, a dependency of the material properties of the container is no longer relevant because the antenna and the wireless module can be arranged outside of the container. Elaborate fastening mechanisms and cable glands as required by the prior art are no longer needed.

Due to the present invention, it is now possible to quickly and easily attach fill level sensors at a metrology point, e.g. and preferably in a metal container, and to enable an interference-free wireless connection. The dependency on special fastening devices such as flanges or threads on the metrology point is eliminated. A simple bore is sufficient for installation.

The fastening device, in particular the second part of the fastening device, can have a very flat form factor and therefore continues to enable containers to be stacked.

DETAILED DESCRIPTION OF THE FIGURES

FIG. 1 shows a metrology arrangement 1 for fill level measurement in a metal tank, having an autonomous field device 3 formed as a fill level metrology device, according to the present application.

In the present embodiment, the autonomous fill level metrology device 3 is formed as a radar fill level metrology device and measures the fill level of a medium 22 in a container 20. A bore is formed in a wall 21 of the container 20, in which the autonomous film level metrology device 3 is held using a fastening device 5. For this purpose, the fastening device 5 has a first sensor side part 51 that is arranged in the container 20 together with at least the radar sensor for fill level measurement.

The fill level sensor is arranged in a circular-cylindrical housing 7 that is formed as a single piece with the first part 51 of the fastening device 5. For purposes of forming a mechanical interface, the first part 51 of the fastening device has a circular cylindrical stud-shaped extension that is arranged in the bore in the wall 21 and in this manner reaches through the wall 21 The second part 52 of the fastening device 5 is arranged on the side of the wall 21 opposing the first part 51 of the fastening device 5 and is mechanically connected to the stud-shaped extension of the first part 51. The mechanical connection of the first part 51 to the second part 52 can be achieved with various connection mechanisms, wherein a thread 53 is used in the present embodiment to mechanically connect the two parts 51, 52. The stud-shaped extension of the first part 51 has for this purpose an outer thread, and the second part 52 has an inner thread formed correspondingly thereto.

Figure 2:
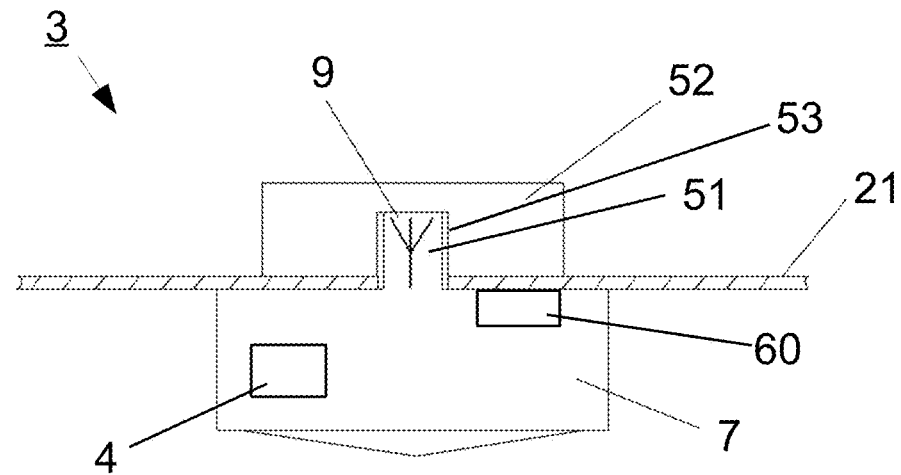
FIG. 2 is a line drawing evidencing an enlarged rendering of a first embodiment of a metrology arrangement according to the present application.

FIG. 2 shows an enlarged rendering of the metrology arrangement 1 from FIG. 1.

The exemplary embodiment shown in FIG. 2, shows a wireless module 4 of the autonomous field device 3 arranged in the sensor side part of the field device. An antenna 9 for wireless communication of the autonomous field device 3 is seated in the stud-shaped extension of the first part 51 of the fastening device 5, and is therefore at least sectionally arranged outside of the container 20, and therefore outside of the metal wall 21. In this manner, wireless communication of the autonomous field device 3 is ensured, which would otherwise not be possible within the metal container 20.

FIG. 2 further clearly shows the first interface formed as a thread 53 between the first part 51 and the second part 52 of the fastening device 5. It is noted at this point that this mechanical interface cannot only be formed as a thread 53, but can also be formed using various other mechanical interfaces, for example socket connections, bayonet connections, various threaded connections, or other quick-release couplings.

Other components of the autonomous field device 3, such as a sensor, sensor electronics, a power supply, and other possible components, are for purposes of clarity not separately shown in the presently shown exemplary embodiment, but are for purposes of the present invention regarded as components of an autonomous field device 3.

Figure 3:
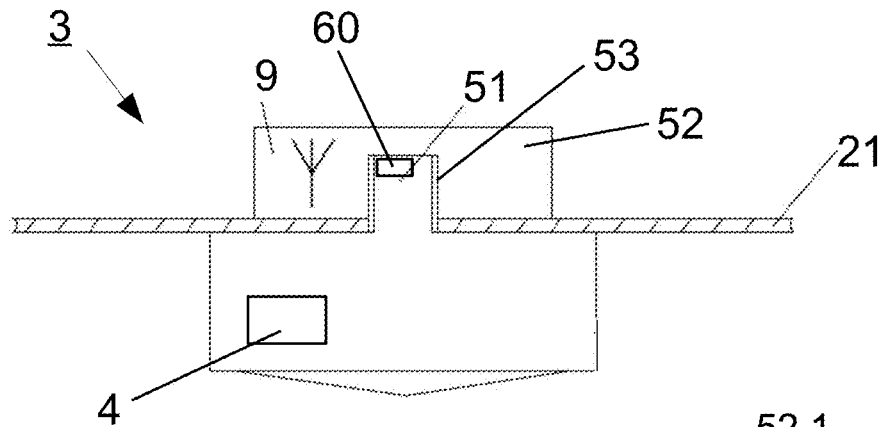
FIG. 3 is a line drawing evidencing an enlarged rendering of a second embodiment of a metrology arrangement according to the present application.

FIG. 3 shows a second exemplary embodiment of a metrology arrangement according to the present application.

The exemplary embodiment shown in FIG. 3 differs from the exemplary embodiment in FIG. 2 in that in addition to the first mechanical interface between the first part 51 and the second part 52 —which is also here implemented using a thread 53—a second electronic interface for signal transmission is formed between the wireless module 4 of the autonomous field device 3 and the antenna 9, which in the present exemplary embodiment is arranged in the second part 52 of the fastening device 5. The second interface for signal transmission is combined with the mechanical interface such that a simple and preferably connection of the first part 51 and the second part 52 can continue to be realized without tools. However, at the same time, a signal transmission between the wireless module 4 and the antenna 9 is ensured, so that wireless communication of the autonomous field device 3 is ensured by the antenna 9 arranged outside the container 20. Activation device 60 further shows as a functional block within first part 51.

Figure 4:
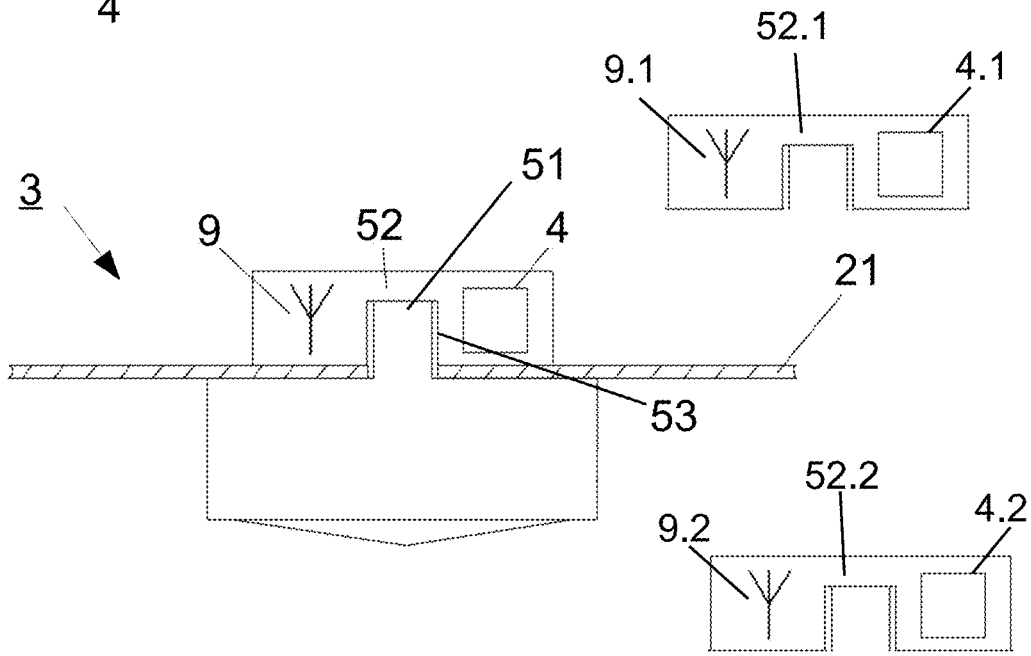
FIG. 4 is a line drawing evidencing an enlarged rendering of a third embodiment of a metrology arrangement according to the present application.

In the third exemplary embodiment shown in FIG. 4, a modular set wherein both the wireless module 4 and also the antenna 9 are arranged in the second part 52 of the fastening device 5. Also in this exemplary embodiment, a mechanical interface and also an electronic interface for signal transmission is formed between the first part 51 and the second part 52. However, because in the present exemplary embodiment the wireless module 4 and the antenna 9 are both arranged in the second part 52 of the fastening device 5, the underlying wireless technology can be achieved for another wireless standard by simply interchanging a first second part 52.1 having a first wireless module 4.1 and first antenna 9.1 with a second second part 52.2 having a second wireless module 4.2 with a correspondingly adapted second antenna 9.2.

In this manner, it is possible to adapt an existing field device depending on local circumstances to different wireless standards, or to also equip an installed field device 3 with a new wireless module if the underlying wireless standards are developed further.

Figure 5:
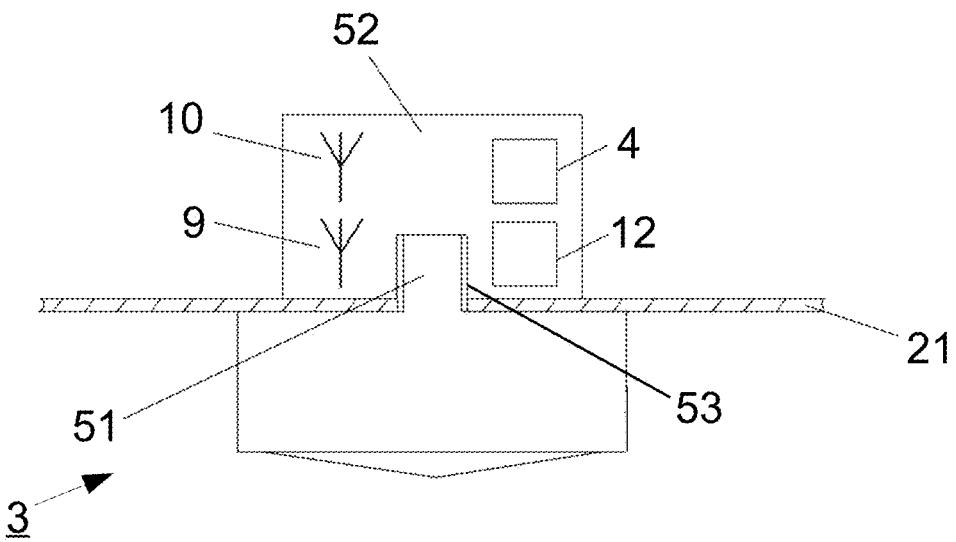
FIG. 5 is a line drawing evidencing an enlarged rendering of a third embodiment of a metrology arrangement according to the present application.

FIG. 5 shows a fourth exemplary embodiment of a metrology arrangement 1 according to the present application.

In the exemplary embodiment shown in FIG. 5, wireless modules 4, 12 and two associated antennas 9, 10 are arranged in the second part 52 of the fastening device 5. In this manner, a field device 3 can also be equipped with different wireless standards, one of which can for example be used for communication with a mobile operator device, and the other can be used for transmitting metrology readings to a cloud. For example, the field device 3 can communicate with the mobile operator device based on the Bluetooth Low Energy Standard, and metrology readings can be transmitted by using a narrowband wireless technology, for example LoRa, Sigfox or NB-IoT.

It is noted at this point that various other components of an autonomous field device 3 can also be arranged in the second part 52 of the field device 3. The power supply and the display and/or operator elements are named in particular at this point. It is advantageous for a power supply that the second part 52 of the fastening device 5 is generally accessible from the exterior without opening the container 20, so that for example a battery change can be performed without dismantling the field device 3 Additionally, various other power sources to supply the field device 3 can also be used outside of the container. Energy harvesting modules are named as examples in this case.

LIST OF REFERENCE NUMBERS

1 Metrology arrangement
3 Autonomous field device
4 Wireless module
5 Fastening device
7 Housing
9 Antenna
10 Second antenna
12 Second wireless module
20 Container
21 Wall
22 Medium
51 First part
52 Second part
53 Screw thread
60 Activation device Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. An autonomous field device for process automation, having a sensor, a wireless module, and a fastening device to fasten the field device on a wall, wherein the fastening device has at least a two-part design and is formed such that a first, sensor-side part of the fastening device can be installed from a first side of the wall and a second part of the fastening device can be installed from a second side of the wall, wherein the parts of the fastening device form a mechanical first interface penetrating the wall in order to fasten the field device on the wall in this manner, wherein at least one part of the fastening device is formed to penetrate the wall wherein, for purposes of forming a mechanical interface, the first part of the fastening device has a single circular cylindrical stud-shaped extension wherein the second part of the fastening device is arranged on the side of the wall opposing the first part of the fastening device and is mechanically connected to the stud-shaped extension of the first part wherein, by using the mechanical interface formed by the parts of the fastening device, the two parts of the fastening device are joined to each other such that the field device is fastened on the wall, wherein the second part of the fastening device comprises at least one antenna and at least one wireless module to form an electrically connected second interface for signal and/or power transmission.

2. The autonomous field device of claim 1, wherein a part of the first part of the fastening device is at least sectionally formed as a housing of the field device.

3. The autonomous field device of claim 1, wherein the second part of the fastening device has an antenna.

4. The autonomous field device of claim 1, wherein the second part of the fastening device has a display and/or operator unit.

5. The autonomous field device of claim 1, wherein the first interface is formed as a threaded, snap, bayonet, or socket connection.

6. The autonomous field device of claim 1, wherein the first interface can be operated without tools.

7. The autonomous field device of claim 1, wherein the first interface can be exclusively operated with special-purpose tools.

8. The autonomous field device of claim 1, wherein the first part of the fastening device comprises a gasket that is compressed against the wall by fastening the field device such that said gasket is brought into contact with the wall to form a seal.

9. The autonomous field device of claim 1, wherein the second part of the fastening device is formed to be driven over.

10. The autonomous field device of claim 1, further comprising an activation device designed such that the field device can only be activated in a state installed on a wall.

11. The autonomous field device of claim 10, further comprising an activation device designed such that the field device is automatically activated in the installed state.

12. The autonomous field device of claim 1, comprising a modular set consisting of a first part and at least two second parts having respectively different wireless modules for implementing different wireless standards.

* * * * *